United States Patent
Lo et al.

(10) Patent No.: US 10,645,319 B2
(45) Date of Patent: May 5, 2020

(54) PIXEL CIRCUIT AND IMAGE SENSING SYSTEM

(71) Applicant: Shenzhen Goodix Technology Co., Ltd., Shenzhen, Guangdong (CN)

(72) Inventors: Yen-Hung Lo, Taipei (TW); Meng-Ta Yang, Taipei (TW)

(73) Assignee: Shenzhen Goodix Technology Co., Ltd., Shenzhen, Guangdong (CN)

(*) Notice: Subject to any disclaimer, the term of this patent is extended or adjusted under 35 U.S.C. 154(b) by 108 days.

(21) Appl. No.: 15/890,321

(22) Filed: Feb. 6, 2018

(65) Prior Publication Data
US 2019/0020837 A1    Jan. 17, 2019

Related U.S. Application Data

(63) Continuation of application No. PCT/CN2017/093023, filed on Jul. 14, 2017.

(51) Int. Cl.
| | | |
|---|---|---|
| H04N 5/369 | (2011.01) | |
| G01S 7/4863 | (2020.01) | |
| H04N 5/3745 | (2011.01) | |
| G01S 17/89 | (2020.01) | |
| G06T 7/521 | (2017.01) | |
| H04N 5/225 | (2006.01) | |
| H04N 5/353 | (2011.01) | |
| H04N 5/378 | (2011.01) | |

(52) U.S. Cl.
CPC ......... *H04N 5/3696* (2013.01); *G01S 7/4863* (2013.01); *G01S 17/89* (2013.01); *G06T 7/521* (2017.01); *H04N 5/2256* (2013.01); *H04N 5/3535* (2013.01); *H04N 5/36965* (2018.08); *H04N 5/378* (2013.01); *H04N 5/37452* (2013.01)

(58) Field of Classification Search
CPC .. H04N 5/3696; H04N 5/3535; H04N 5/2256; H04N 5/378; G06T 7/521
USPC ....................................................... 348/135
See application file for complete search history.

(56) References Cited

U.S. PATENT DOCUMENTS

| | | |
|---|---|---|
| 5,705,807 A | 1/1998 | Throngnumchai |
| 2006/0027730 A1 | 2/2006 | Bamji |
| 2008/0079833 A1 | 4/2008 | Ichikawa |
| 2010/0308209 A1 | 12/2010 | Buettgen |

(Continued)

FOREIGN PATENT DOCUMENTS

| | | |
|---|---|---|
| CN | 1658263 A | 8/2005 |
| CN | 103562988 A | 2/2014 |

(Continued)

*Primary Examiner* — Tung T Vo
(74) *Attorney, Agent, or Firm* — Winston Hsu

(57) ABSTRACT

The present application provides a pixel circuit, applied in an image sensing system. The pixel circuit is coupled to a first collection node and a second collection node. The pixel circuit includes a first capacitor; a second capacitor; a first shutter switch coupled between the first capacitor and the first collection node; a second shutter switch coupled between the second capacitor and the second collection node; a third shutter switch coupled between the second capacitor and the first collection node; a fourth shutter switch coupled between the first capacitor and the second collection node; and a common mode reset module coupled to the first capacitor and the second capacitor.

7 Claims, 5 Drawing Sheets

(56) References Cited

U.S. PATENT DOCUMENTS

| | | |
|---|---|---|
| 2017/0053595 A1 | 2/2017 | Liu |
| 2017/0142352 A1 | 5/2017 | Pang |
| 2018/0198997 A1* | 7/2018 | Otaka .................. H04N 5/3575 |
| 2018/0220086 A1* | 8/2018 | Hynecek .............. H04N 5/3559 |

FOREIGN PATENT DOCUMENTS

| | | |
|---|---|---|
| CN | 104575348 A | 4/2015 |
| CN | 105681695 A | 6/2016 |
| JP | 2008-89346 A | 4/2008 |

\* cited by examiner

PIXEL CIRCUIT AND IMAGE SENSING SYSTEM

CROSS REFERENCE TO RELATED APPLICATIONS

The present application is a continuation of international application No. PCT/CN2017/093023, filed on Jul. 14, 2017, of which are incorporated herein by reference in its entirety.

FIELD OF THE INVENTION

The present application relates to a pixel circuit and an image sensing system, and more particularly, to a pixel circuit and an image sensing system capable of determining image depth accurately.

BACKGROUND

Optical distance measuring device may utilize 3D image sensing system to collect the distance/depth information related to a target. Through the distances/depths corresponding to the pixels of the 3D images, 3D image data is formed. 3D images are also called as distance images or depth images. The extra distance dimension may be applied in various applications, so as to obtain information between the camera and the object, to accomplish different tasks in the sensing area in the field.

In general, 3D image sensing system emits incident light by light emitting diode (LED), and utilizes pixel circuits in a pixel array to receive a reflected light corresponding to the incident light. However, in the prior art, the pixel circuit applied in the 3D image sensing system in the art needs to operate in a condition that manufacturing of the semiconductor devices and the clock signals are perfectly matched up, so as to determine the depth information correctly. In reality, manufacturing of the semiconductor devices and the clock signals are usually not matched, causing that the image sensing system is not able to obtain the depth information accurately. In addition, when the pixel circuit senses the reflected light, it would be affected by the ambient light, which would cause the common mode voltage of the output signal of the pixel circuit being too large, occupy too much dynamic range of the backend amplifier, and cause the backend amplifier entering into a saturation status easily.

Therefore, it is necessary to improve the prior art.

SUMMARY

It is therefore a primary objective of the present application to provide a pixel circuit and an image sensing system capable of determining image depth accurately, to improve over disadvantages of the prior art.

To solve the problem stated in the above, an embodiment of the present application provides a pixel circuit applied in an image sensing system. The pixel circuit is coupled to a first collection node and a second collection node. The pixel circuit comprises a first capacitor; a second capacitor; a first shutter switch, coupled between the first capacitor and the first collection node; a second shutter switch, coupled between the second capacitor and the second collection node; a third shutter switch, coupled between the second capacitor and the first collection node; a fourth shutter switch, coupled between the first capacitor and the second collection node; and a common mode reset module, coupled to the first capacitor and the second capacitor.

For example, within a first time, the first shutter switch and the second shutter switch are conducted, the third shutter switch and the fourth shutter switch are cutoff; within a second time, the first shutter switch and the second shutter switch are cutoff, the third shutter switch and the fourth shutter switch are conducted.

For example, the first time and the second time have the same time length.

For example, the pixel circuit further comprises a first output module and a second output module, wherein the first output module comprises a first source follower transistor and a first read transistor, a gate of the first source follower transistor is coupled to the first capacitor, a source of the first source follower transistor is coupled to the first read transistor; the second output module comprises a second source follower transistor and a second read transistor, a gate of the second source follower transistor is coupled to the second capacitor, a source of the second source follower transistor is coupled to the second read transistor.

For example, the common mode reset module comprises a first transistor, coupled to a first terminal of the first capacitor; a second transistor, coupled to a first terminal of the second capacitor; a first reset transistor, coupled between a second terminal of the first capacitor and the first terminal of the second capacitor; and a second reset transistor, coupled between a second terminal of the second capacitor and the first terminal of the first capacitor.

For example, gates of the first transistor and the second transistor receive a common mode reset signal, and gates of the first reset transistor and the second reset transistor receive a pixel reset signal.

For example, when the first reset transistor and the second reset transistor are conducted, the first transistor and the second transistor are cutoff.

To solve the problem stated in the above, an embodiment of the present application provides a pixel circuit, comprising a first alternative charging module comprising a first capacitor, with a first terminal and a second terminal; a first shutter switch, coupled between the first terminal and the first collection node; a second shutter switch, coupled between the second terminal and the first collection node; a third shutter switch, with a terminal coupled to the second terminal, and another terminal receiving a voltage; and a fourth shutter switch, with a terminal coupled to the first terminal, and another terminal receiving the voltage; and a second alternative charging module, comprising a second capacitor, with a third terminal and a fourth terminal; a fifth shutter switch, coupled between the third terminal and the second collection node; a sixth shutter switch, coupled between the fourth terminal and the second collection node; a seventh shutter switch, with a terminal coupled to the fourth terminal, and another terminal receiving the voltage; and an eighth shutter switch, with a terminal coupled to the third terminal, and another terminal receiving the voltage.

For example, within a first time, the first shutter switch, the third shutter switch, the fifth shutter switch and the seventh shutter switch are conducted, and the second shutter switch, the fourth shutter switch, the sixth shutter switch and the eighth shutter switch are cutoff; and within a second time, the first shutter switch, the third shutter switch, the fifth shutter switch and the seventh shutter switch are cutoff, and the second shutter switch, the fourth shutter switch, the sixth shutter switch and the eighth shutter switch conducted.

For example, the pixel circuit further comprises a first output module and a second output module, wherein the first output module comprises a first transistor, a first source follower transistor and a first read transistor, a gate of the first source follower transistor is coupled to the first capacitor via the first read transistor, and a source of the first source follower transistor is coupled to the first transistor; the second output module comprises a second transistor, a second source follower transistor and a second read transistor, a gate of the second source follower transistor is coupled to the second capacitor via the second read transistor, and a source of the second source follower transistor is coupled to the second transistor.

For example, within a third time, when the first read transistor and the second read transistor are conducted, the fourth shutter switch and the eighth shutter switch are conducted.

For example, the first shutter switch, the third shutter switch, the fifth shutter switch and the seventh shutter switch are controlled by a first shutter signal, the second shutter switch and the sixth shutter switch are controlled by a second shutter signal, the fourth shutter switch and the eighth shutter switch are controlled by a third shutter signal, the first collection node is configured to collect photo charges formed around a first polysilicon gate, the second collection node is configured to collect photo charges formed around a second polysilicon gate, the first polysilicon gate receives a first clock signal, and the second polysilicon gate receives a second clock signal.

For example, when the first shutter signal controls the first shutter switch, the third shutter switch, the fifth shutter switch and the seventh shutter switch to be conducted, an edge of the first shutter signal and an edge of the first clock signal are aligned.

When the second shutter signal controls the second shutter switch, the fourth shutter switch, the sixth shutter switch and the eighth shutter switch conducted, edges of the second shutter signal and the third shutter signal and an edge of the first clock signal are aligned.

For example, when the first shutter signal controls the first shutter switch, the third shutter switch, the fifth shutter switch and the seventh shutter switch to be conducted, the first clock signal and a modulation signal are synchronized; when the second shutter signal controls the second shutter switch, the fourth shutter switch, the sixth shutter switch and the eighth shutter switch to be conducted, the second clock signal and the modulation signal are synchronized.

To solve the problem stated in the above, an embodiment of the present application provides an image sensing system, comprising a light emitting module, configured to emit an incident light according to a modulation signal; and a pixel array, configured to receive a reflected light corresponding to the incident light, wherein the pixel array comprises a plurality of pixel units, each pixel unit comprises a pixel light sensing region and a pixel circuit, where the pixel circuit comprises two capacitor and at least four shutter switches, to charge the two capacitors alternatively.

The present application utilizes a plurality of shutter switches, to charge the two capacitors alternatively, so as to overcome the disadvantages of mismatches of semiconductor devices and clock signals, and to overcome the disadvantages of too large common mode voltage which occupies the dynamic range of the backend amplifier, causing the backend amplifier entering into a saturation status.

These and other objectives of the present application will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present application become more apparent, the following relies on the accompanying drawings and embodiments to describe the present application in further detail. It should be understood that the specific embodiments described herein are only for explaining the present application and are not intended to limit the present application.

Figure 1:
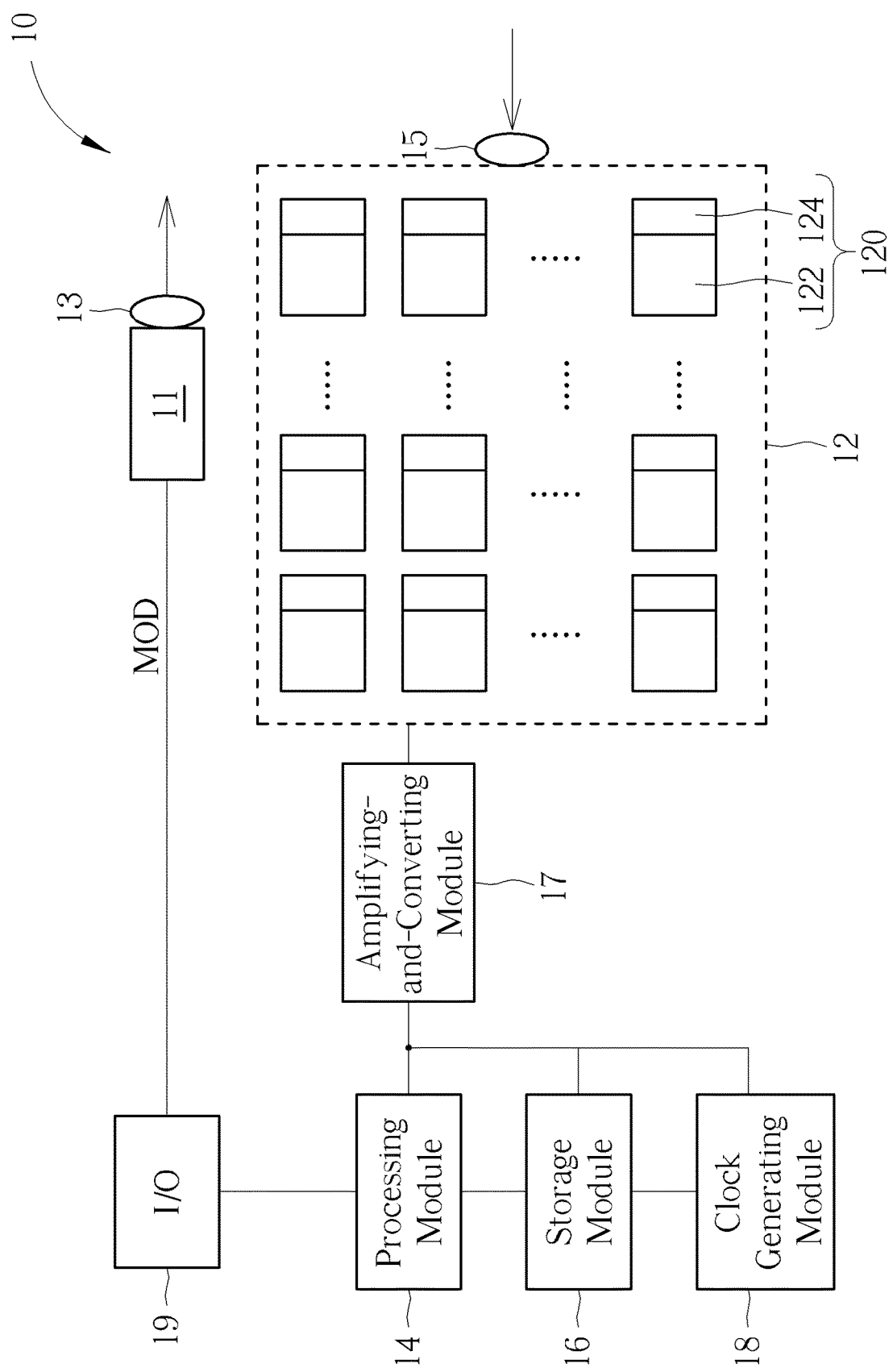
FIG. 1 is a schematic diagram of an image sensing system according to an embodiment of the present application.

Please refer to FIG. 1. FIG. 1 is a schematic diagram of an image sensing system 10 according to an embodiment of the present application. The image sensing system 10 is a 3D image sensing device, which may obtain a distance related to a target (not illustrated in FIG. 1) according to time of flight (ToF) of the ray/light, so as to construct the 3D image of the target. As shown in FIG. 1, the image sensing system 10 comprises a pixel array 12, a processing module 14, a storage module 16, a clock generating module 18, an I/O interface 19, a light emitting module 11, an amplifying-and-converting module 17 and lenses 13, 15. The light emitting module 11 may be light emitting diode (LED) emitting invisible light, e.g., infrared ray LED. The image sensing system 10 uses the light emitting module 11 to emit an incident light through the lens 13, and uses the pixel array 12 to receive a reflected light corresponding to the incident light. Specifically, the clock generating module 18 of the image sensing system 10 would generate a modulation signal MOD to/for the light emitting module 11, and the light emitting module 11 emits the incident light according to the modulation signal MOD. The pixel array 12 comprises a plurality of pixel units 120 arranged as an array. The pixel unit 120 comprises a pixel light sensing region 124 and a pixel circuit 122. The pixel light sensing region 124 receives the reflected light and forms photo charges or photo current. The pixel circuit 122 converts the photo charges or the photo current formed by the pixel light sensing region 124 into an electrical signal and output the electrical signal to the amplifying-and-converting module 17. The amplifying-and-converting module 17 amplifies and converts the electrical signals outputted by the plurality of pixel units 120 into digital signals, and output the digital signals to the processing module 14. The processing module 14 obtains the distance related to the image sensing system 10 according to the digital signals, so as to construct the 3D image of the target.

Figure 2:
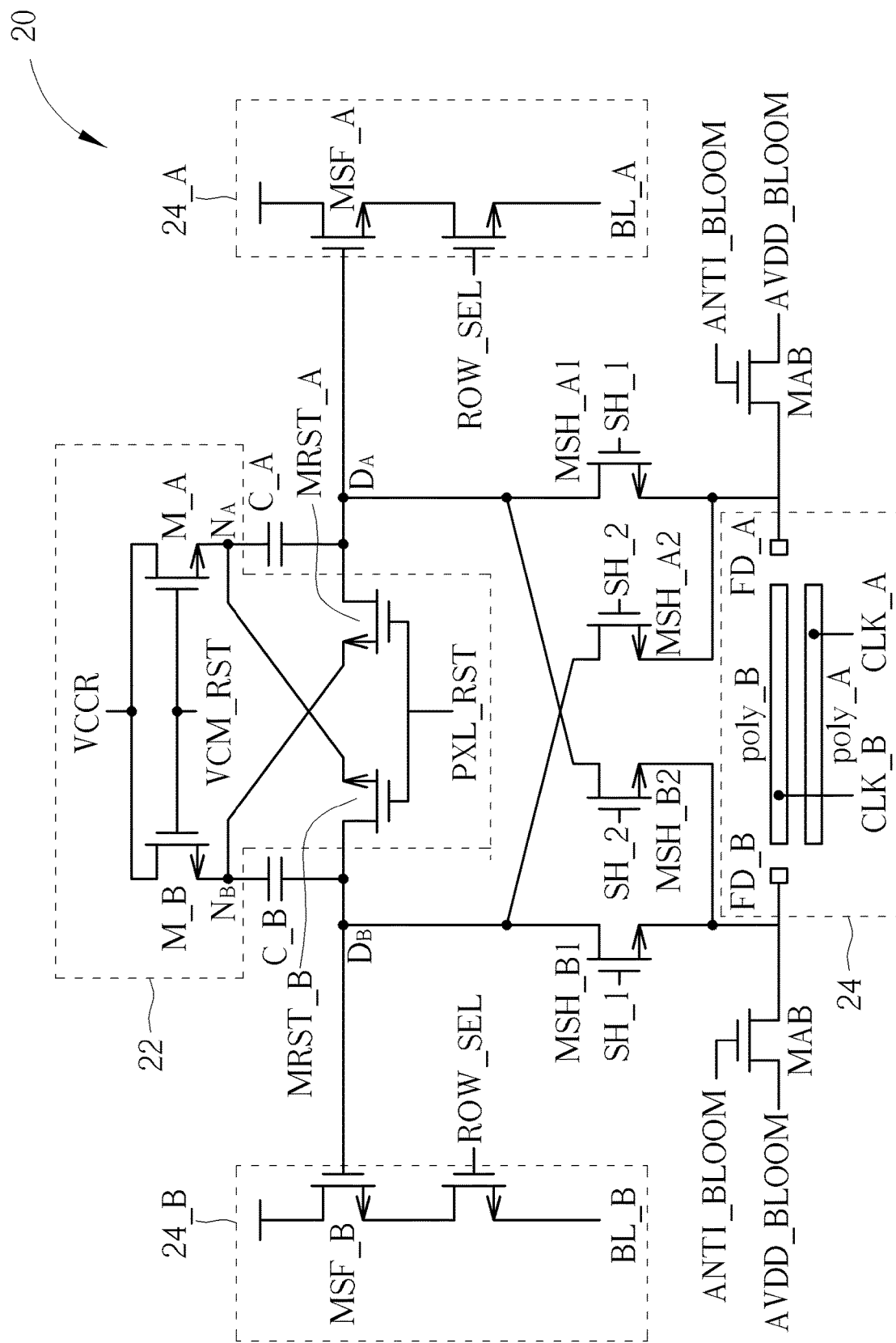
FIG. 2 is a schematic diagram of a pixel circuit according to an embodiment of the present application.
Figure 3:
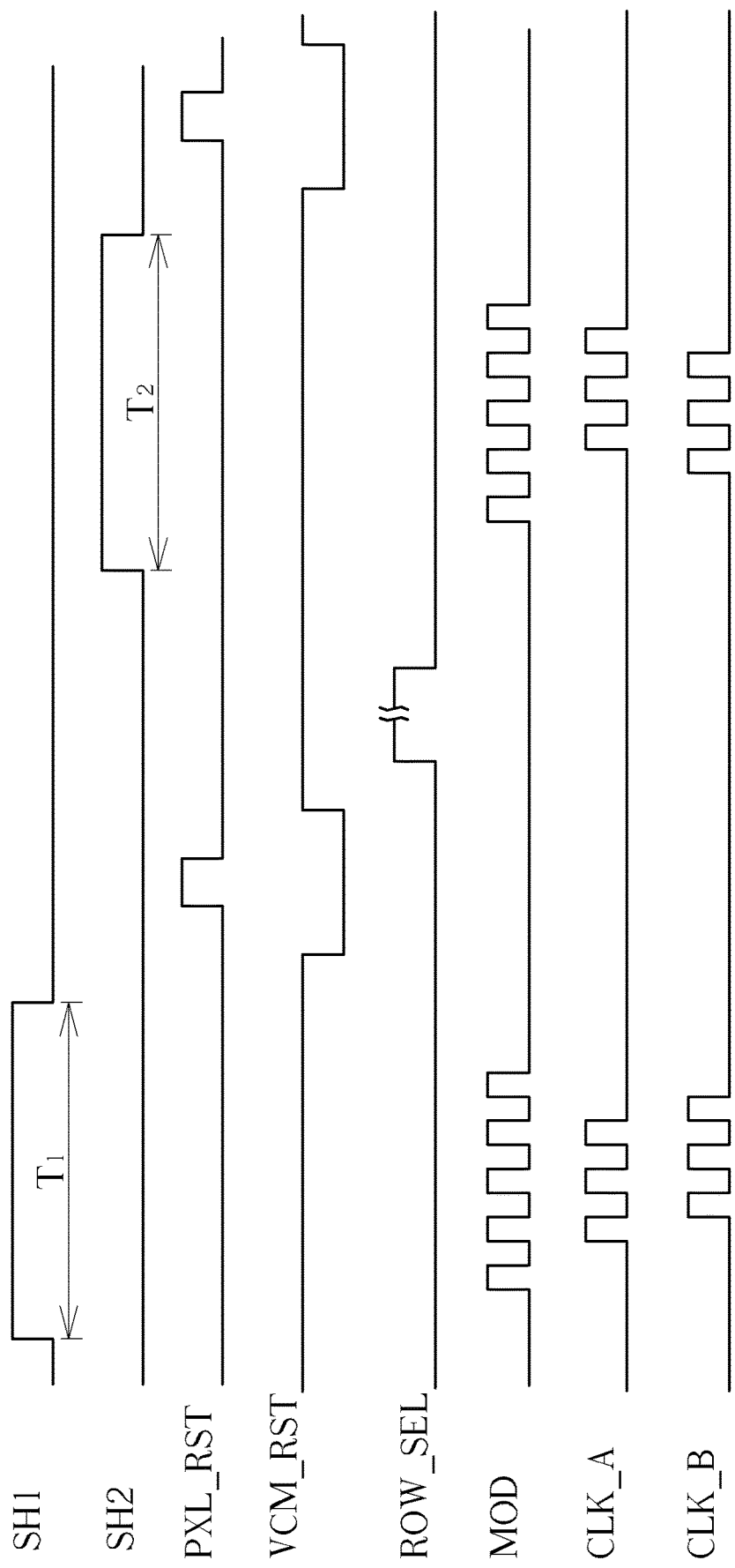
FIG. 3 is a timing diagram of a plurality of signals according to an embodiment of the present application.

Please refer to FIG. 2 and FIG. 3 to see the details of the pixel circuit 122 and the pixel light sensing region 124. FIG. 2 is a schematic diagram of a pixel circuit 20 according to an embodiment of the present application. FIG. 3 is a timing diagram of a plurality of signals in the pixel circuit 20. The pixel circuit 20 may be used to realize the pixel circuit 122, which is coupled to the pixel light sensing region 124. The pixel light sensing region 124 may be a p-substrate. On the p-substrate, polysilicon gates Poly_A, Poly_B, a first collection node FD_A and a second collection node FD_B are disposed. The polysilicon gates Poly_A and Poly_B receive clock signals CLK_A and CLK_B, respectively, which may be generated by the clock generating module 18. The first collection node FD_A and the second collection node FD_B may collect photo charges or photo current formed by irradiation. The pixel circuit 20 is coupled to the first collection node FD_A and the second collection node FD_B.

The pixel circuit 20 comprises a common mode reset (CMR) module 22, output modules 24_A and 24_B, a first capacitor C_A, a second capacitor C_B and shutter switches MSH_A1, MSH_B1, MSH_A2 and MSH_B2. As shown in FIG. 2, the CMR module 22 is coupled to the first capacitor C_A and the second capacitor C_B. The CMR module 22 comprises transistors M_A, M_B and reset transistors MRST_A, MRST_B. Drains of the transistors M_A, M_B receive a voltage VCCR. Gates of the transistors M_A, M_B are connected to each other and receive a common mode reset signal VCM_RST. A source of the transistor M_A is coupled to a first terminal $N_A$ of the first capacitor C_A. A source of the transistor M_B is coupled to a first terminal $N_B$ of the second capacitor C_B. The reset transistor MRST_A is coupled between a second terminal $D_A$ of the first capacitor C_A and the first terminal $N_B$ of the second capacitor C_B. The reset transistor MRST_B is coupled between a second terminal $D_B$ of the second capacitor C_B and the first terminal $N_A$ of the first capacitor C_A. Gates of the reset transistors MRST_A and MRST_B are connected to each other and receive a pixel reset signal PXL_RST.

The shutter switch MSH_A1 is coupled between the second terminal $D_A$ of the first capacitor C_A and the first collection node FD_A. The shutter switch MSH_B1 is coupled between the second terminal $D_B$ of the second capacitor C_B and the second collection node FD_B. The shutter switch MSH_A2 is coupled between the second terminal $D_B$ of the second capacitor C_B and the first collection node FD_A. The shutter switch MSH_B2 is coupled between the second terminal $D_A$ of the first capacitor C_A and the second collection node FD_B. The shutter switches MSH_A1 and MSH_B1 are controlled by a first shutter signal SH_1 to be conducted or cutoff. The shutter switches MSH_A2 and MSH_B2 are controlled by a second shutter signal SH_2 to be conducted or cutoff.

Within a first time $T_1$, the shutter switches MSH_A1 and MSH_B1 are conducted and the shutter switches MSH_A2 and MSH_B2 are cutoff. In other words, within the first time $T_1$, the photo charges formed by the irradiation around the first collection node FD_A would be accumulated in the first capacitor C_A, such that a voltage drop $\Delta A_1$ is formed at the terminal $D_A$. The photo charges formed by the irradiation around the second collection node FD_B would be accumulated in the second capacitor C_B, such that a voltage drop $\Delta B_1$ is formed at the terminal $D_B$. Therefore, the pixel circuit 20 may output electrical signals $V_{DA}$ and $V_{DB}$ at the terminals $D_A$ and $D_B$ to the amplifying-and-converting module 17 and the processing module 14. The processing module 14 obtains the distance related to the image sensing system 10 according to the digital signals outputted by the pixel units 20, so as to construct the 3D image of the target.

In an embodiment, the clock signal CLK_A and the modulation signal MOD, outputted to the light emitting module 11, are synchronized/aligned, and a phase difference between the clock signal CLK_A and the clock signal CLK_B is 180°. In other words, the light emitting module 11 emits the incident light according to the modulation signal MOD. Since the polysilicon gate Poly_A receives the clock signal CLK_A and the polysilicon gate Poly_B receives the clock signal CLK_B, the photo current I_A corresponding to the first collection node FD_A (or the electrical signal $V_{DA}$ at the terminal $D_A$) represents the received ambient light as well as the reflected light from the light emitting module 11, and the photo current I_B corresponding to the second collection node FD_B (or the electrical signal $V_{DB}$ at the terminal $D_B$) represents the ambient light and the reflected light from the light emitting module 11. Therefore, after proper demodulation computation, a difference between the electrical signal $V_{DA}$ at the terminal $D_A$ and the electrical signal $V_{DB}$ at the terminal $D_B$ represents the reflected light from the light emitting module 11.

However, under a condition that mismatch exists between the collection nodes FD_A and FD_B due to manufacturing reason, or under a condition that mismatch exists between the clock signal CLK_A and CLK_B (i.e., the clock signals CLK_A and CLK_B have different duty period), within one single first time T1, the difference between the electrical signal $V_{DA}$ at the terminal $D_A$ and the electrical signal $V_{DB}$ at the terminal $D_B$, in addition to representing the ambient light, includes signal components caused by manufacturing mismatch and also clock mismatch between the clock signals CLK_A and CLK_B. Thus, the processing module 14 is not able to correctly determine the distance of the image sensing system 10 in related to the target according to the output of the pixel circuit 20 within one single first time $T_1$, such that the distance measuring performance of the image sensing system 10 is degraded.

To overcome the mismatch between the collection nodes FD_A and FD_B or the mismatch between the clock signals CLK_A and CLK_B, within a second time $T_2$, the shutter switches MSH_A1 and MSH_B1 of the pixel circuit 20 are cutoff and the shutter switches MSH_A2 and MSH_B2 conducted. In other words, within the second time T2, the photo charges formed by the irradiation around the first collection node FD_A would be accumulated in the second capacitor C_B, such that a voltage drop $\Delta B_2$ is formed at the terminal $D_B$. The photo charges formed by the irradiation around the second collection node FD_B would be accumulated in the first capacitor C_A, such that a voltage drop $\Delta A_2$ is formed at the terminal $D_A$. Moreover, the first time $T_1$ and the second time $T_2$ have the same time length (i.e., $T_1=T_2$), which means that the time period of the first shutter signal SH_1 being high is the same as the one of the second shutter signal SH_2 being high. Therefore, the difference between the electrical signal $V_{DA}$ at the terminal $D_A$ and the electrical signal $V_{DB}$ at the terminal $D_B$ may simply represent the reflected light from the light emitting module 11, and the signal components caused by manufacturing mismatch and also clock mismatch between the clock signals CLK_A and CLK_B are excluded. Thus, the processing module 14 is able to correctly determine the distance of the image sensing system 10 in related to the target, the distance measuring performance of the image sensing system 10 is enhanced.

In addition, the CMR module 22 may perform common mode reset operation. Details of the common mode reset operation performed by the CMR module 22 are described as follows. When the CMR module 22 does not perform the common mode reset operation, the transistors M_A and M_B are conducted (the common mode reset signal VCM_RST is high) and the reset transistors MRST_A and MRST_B are cutoff (the pixel reset signal PXL_RST is low). When the CMR module 22 performs the common mode reset operation, the transistors M_A and M_B are cutoff (the common mode reset signal VCM_RST is low in the beginning) and the reset transistors MRST_A and MRST_B are conducted during a portion of an time interval of the transistors M_A and M_B being cutoff. At this time, the terminal $D_A$ is coupled to the terminal $N_B$ and the terminal $D_B$ is coupled to the terminal $N_A$. According to the charge conservation theorem, voltage variations $\Delta V_A$ and $\Delta V_B$, caused by the first capacitor C_A and the second capacitor C_B due to the reset transistors MRST_A and MRST_B being conducted, have relationship of $\Delta V_A + \Delta V_B = 0$ and $\Delta V_A - \Delta V_B = c$ (where c is a specific constant). Therefore, a differential signal between the first capacitor C_A and the second capacitor C_B would be preserved and a common mode signal of the first capacitor C_A and the second capacitor C_B would be cancelled.

In addition, the output module 24_A comprises an source follower transistor MSF_A and a read transistor MRD_A. A gate of the source follower transistor MSF_A is coupled to the first capacitor C_A. A source of the source follower transistor MSF_A is coupled to the read transistor MRD_A. A source of the read transistor MRD_A outputs a bit line signal BL_A. Similarly, the output module 24_B comprises an source follower transistor MSF_B and a read transistor MRD_B. A gate of the source follower transistor MSF_B is coupled to the second capacitor C_B. A source of the source follower transistor MSF_B is coupled to the read transistor MRD_B. A source of the read transistor MRD_B outputs a bit line signal BL_B. The pixel circuit outputs the bit line signals BL_A and BL_B to the amplifying-and-converting module 17, and the amplifying-and-converting module 17 may performs differential amplification and analog-to-digital conversion on the bit line signals BL_A and BL_B.

In addition, the pixel circuit 20 comprises transistors MAB. The transistors MAB, coupled to the first collection node FD_A and the second collection node FD_B, are conducted when a read signal ROW_SEL is high, which is to prevent the voltage at the terminal $D_A$ or the terminal $D_B$ from being affected by the first collection node FD_A and the second collection node FD_B due to leakage current during the read phase of the pixel circuit 20 (when the read signal ROW_SEL is high).

Figure 4:
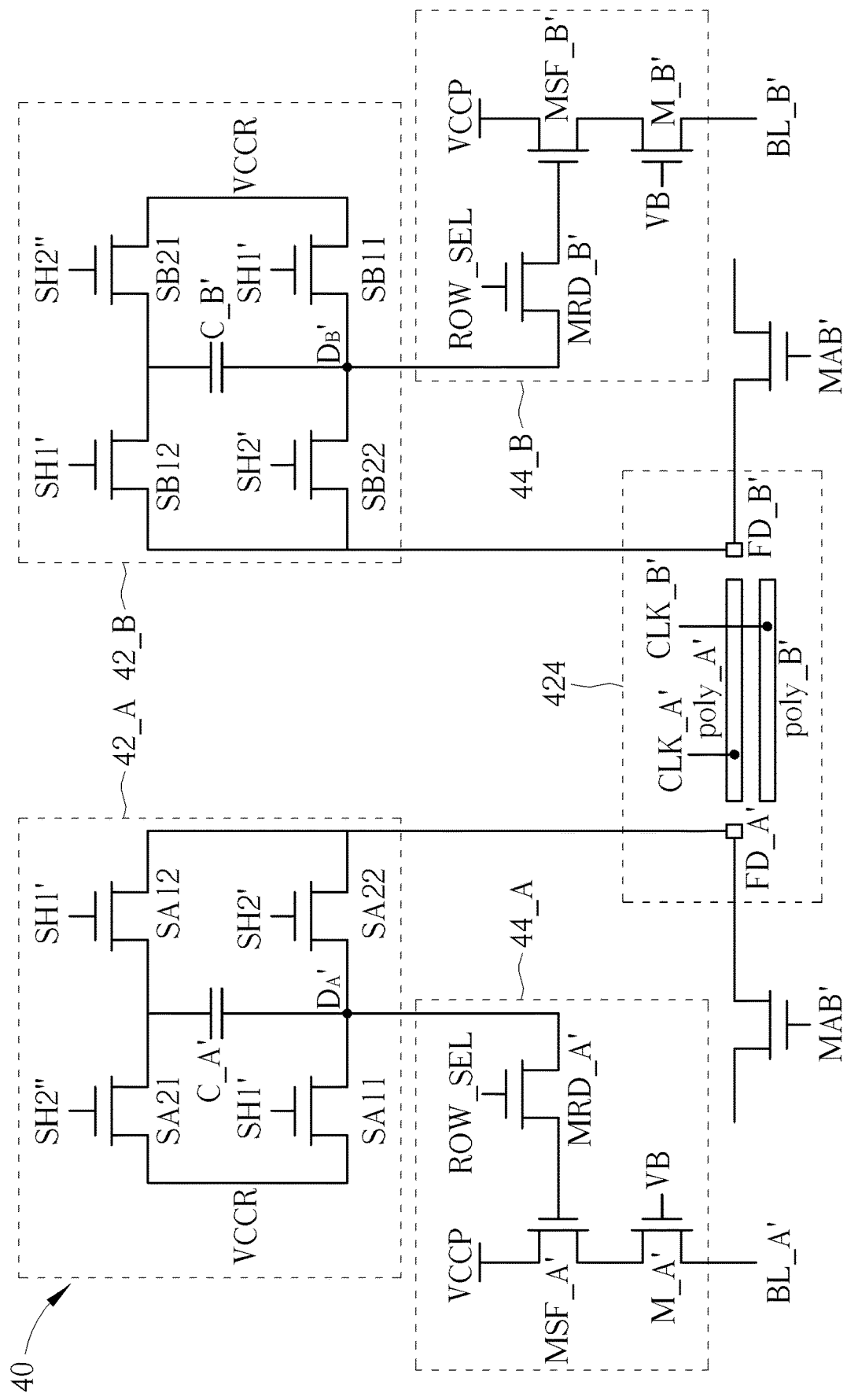
FIG. 4 is a schematic diagram of a pixel circuit according to another embodiment of the present application.
Figure 5:
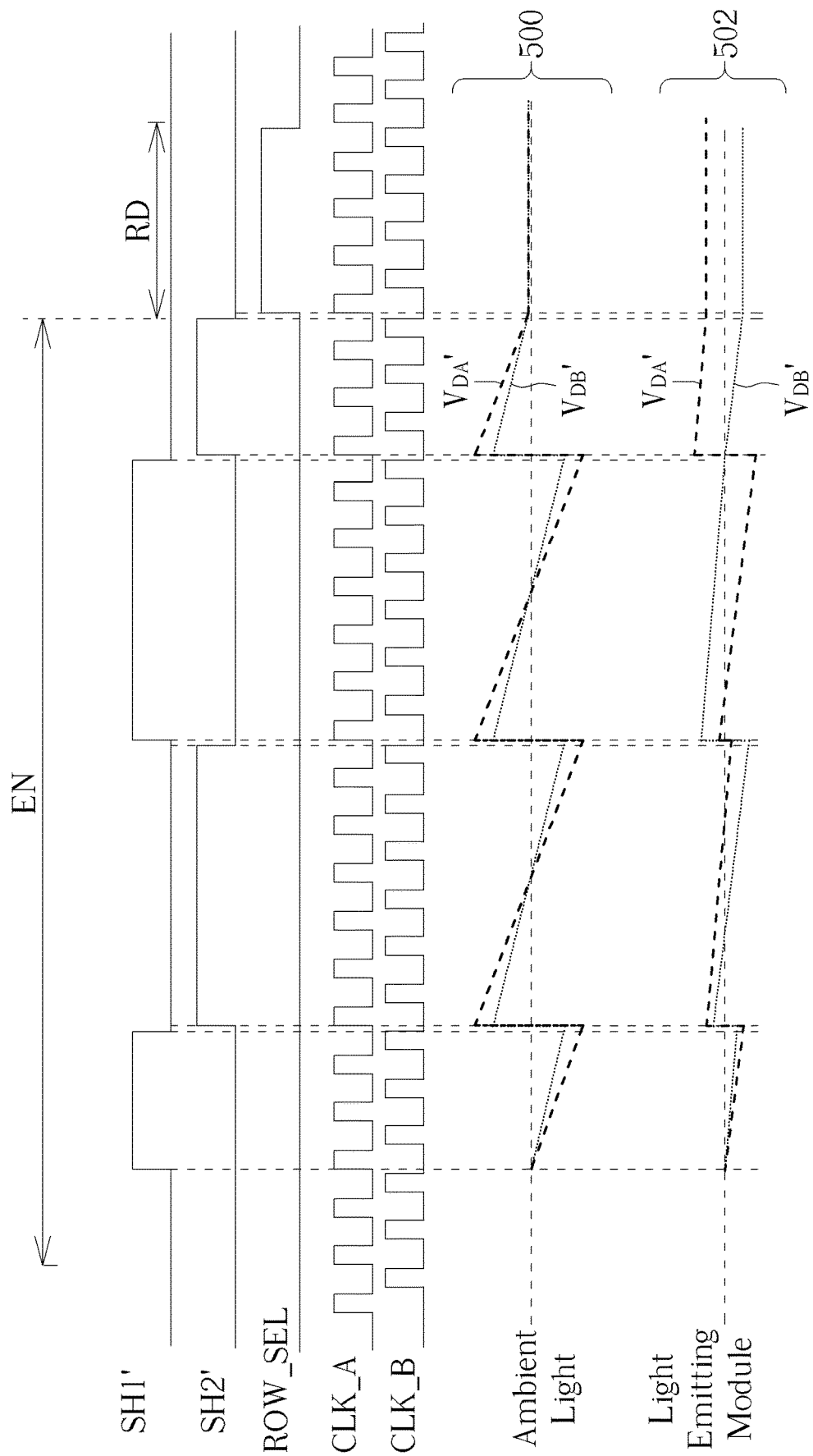
FIG. 5 is a timing diagram of a plurality of signals according to an embodiment of the present application.

Furthermore, please refer to FIG. 4 and FIG. 5. FIG. 4 is a schematic diagram of a pixel circuit 40 according to another embodiment of the present application. FIG. 5 is a timing diagram of a plurality of signals in the pixel circuit 40. The pixel circuit 40, coupled to a first collection node FD_A' and a second collection node FD_B' of the pixel light sensing region 424, may also be used to realize the pixel circuit 122. The first collection node FD_A' and the second collection node FD_B' are configured to collect photo charges formed around the polysilicon gate ploy A' and the polysilicon gate ploy B', respectively. Moreover, the polysilicon gate ploy A' receives the clock signal CLK_A', and the polysilicon gate ploy B' receives the clock signal CLK_B'. When the clock signal CLK_A' is high, the clock signal CLK_B' is low. When the clock signal CLK_B' is high, the clock signal CLK_A' is low.

The pixel circuit 40 comprises a first alternative charging module 42_A, a second alternative charging module 42_B, a first output module 44_A and a second output module 44_B. The first alternative charging module 42_A is coupled to the first collection node FD_A', and the second alternative charging module 42_B is coupled to the second collection node FD_B'. The first alternative charging module 42_A comprises a first capacitor C_A' and shutter switches SA11, SA12, SA21 and SA22. The first capacitor C_A' has a terminal $N_A$' and a terminal $D_A$'. The shutter switch SA12 is coupled between the terminal NA and the first collection node FD_A'. The shutter switch SA22 is coupled between the terminal $D_A$' and the first collection node FD_A'. A terminal of the shutter switch SA11 is coupled to the terminal $D_A$'. A terminal of the shutter switch SA21 is coupled to the terminal $N_A$'. Another terminals of the shutter switch SA11 and SA21 are connected to each other and receive the voltage VCCR. The second alternative charging module 42_B comprises a second capacitor C_B' and shutter switches SB11, SB12, SB21 and SB22. The second collection node FD_B' has a terminal $N_B$' and a terminal $D_B$'. The shutter switch SB12 is coupled between the terminal $N_A$' and the second collection node FD_B'. The shutter switch SB22 is coupled between the terminal $D_A$' and the second collection node FD_B'. A terminal of the shutter switch SB11 is coupled to the terminal $D_B$'. A terminal of the shutter switch SB21 is coupled to the terminal $N_B$'. Another terminals of the shutter switches SB11 and SB21 are connected to each other and receive the voltage VCCR. In addition, the pixel circuit 40 comprises transistors MAB'. The function of the transistors MAB' is the same as which of the transistors MAB within the pixel circuit 20, and not narrated herein for brevity.

The first output module 44_A comprises a first transistor M_A, a first source follower transistor MSF_A' and a first read transistor MRD_A'. A gate of the first source follower transistor MSF_A' is coupled to the terminal $D_A$' of the first capacitor C_A' via the first read transistor MRD_A'. A source of the first source follower transistor MSF_A' is coupled to the first transistor M_A. A source of the first transistor M_A outputs the bit line signal BL_A'. The first read transistor MRD_A' is controlled by the read signal ROW_SEL.

The second output module 44_B comprises a second transistor M_B, a second source follower transistor MSF_B' and a second read transistor MRD_B'. A gate of the second source follower transistor MSF_B' is coupled to the terminal $D_B$' of the second capacitor C_B' via the second read transistor MRD_B'. A source of the second source follower transistor MSF_B' is coupled to the second transistor M_B. A source of the second transistor M_B outputs the bit line signal BL_B'. The second read transistor MRD_B' is also controlled by the read signal ROW_SEL.

Within a first time T1', the shutter switches SA11, SA12, SB11 and SB12 are conducted and the shutter switches SA21, SA22, SB21 and SB22 are cutoff. Within the second time T2, the shutter switches SA11, SA12, SB11 and SB12 are cutoff and the shutter switches SA21, SA22, SB21 and SB22 are conducted. Specifically, the shutter switches SA11, SA12, SB11 and SB12 are controlled by a shutter signal SH_1'. The shutter switches SA22 and SB22 are controlled by a shutter signal SH_2'. The shutter switches SA21 and SB21 are controlled by a shutter signal SH_2''. The shutter signal SH_2'' is a result of a logic operation or an OR operation of the shutter signal SH_2' and the read signal ROW_SEL. That is, the shutter signal SH_2'' may be represented as SH_2''=(SH_2') OR (ROW_SEL). In other words, when the read transistors MRD_A' and MRD_B' are conducted, the shutter switches SA21 are SB21 are conducted, and the other shutter switches SA11, SA12, SA22, SB11, SB12 and SB22 are cutoff.

Within a charging interval EN, the shutter signal SH_1' and the shutter signal SH_2' are high alternatively, and the time which the shutter signal SH_1' is high does not overlap with the time which the shutter signal SH_2' is high. Within a read interval RD, the read signal ROW_SEL is high, such that the read transistors MRD_A' MRD_B' and the shutter switches SA21, SB21 conducted.

Preferably, within the charging interval EN, a total time which the shutter signal SH_1' is high and a total time which the shutter signal SH_2' is high have the same length. Preferably, when the shutter signal SH_1' controls the shutter switches SA11, SA12, SB11 and SB12 to be conducted, a rising edge of the shutter signal SH_1' is aligned to a rising edge of the clock signal CLK_A'. When the shutter signal SH_2' and the shutter signal SH_2" control the shutter switches SA22, SB22, SA21 and SB21 to be conducted, rising edges of the shutter signal SH_2' and the shutter signal SH_2" are aligned to a rising edge of the clock signal CLK_A'.

In this case, when the shutter signal SH_1' controls the shutter switches SA11, SA12, SB11 and SB12 to be conducted, the clock signal CLK_A' and the modulation signal MOD outputted to/for the light emitting module 11 are synchronized/aligned. The photo current I_A' corresponding to the first collection node FD_A' represents the ambient light and the reflected light from the light emitting module 11, and the photo current I_B' corresponding to the second collection node FD_B' only represents the ambient light. In addition, when the shutter signal SH_2' controls the shutter switches SA21, SA22, SB21 and SB22 to be conducted, the clock signal CLK_B' and the modulation signal MOD outputted to/for the light emitting module 11 are synchronized/aligned. The photo current I_A' corresponding to the first collection node FD_A' represents the ambient light and the reflected light from the light emitting module 11. The photo current I_B' corresponding to the second collection node FD_B' represents the ambient light and the reflected light from the light emitting module 11. After proper demodulation computation, a difference between the electrical signal $V_{DA}'$ at the terminal $D_A'$ and the electrical signal $V_{DB}'$ at the terminal $D_B'$ may represent the reflected light from the light emitting module 11.

As shown in FIG. 5, within the charging interval EN, under a condition that the total time of the shutter signal SH_1' being high is the same as the total time of the shutter signal SH_2' being high, a common mode voltage of the bit line signal BL_A' and the bit line signal BL_B' is equal to zero, preventing the common mode voltage from being too large and occupying too much dynamic range of the backend amplifier, i.e., preventing the backend amplifier from entering into a saturation status. In other words, by charging the first capacitor C_A' and the second capacitor C_B' alternatively within the charging interval EN, the common mode voltage of the bit line signal BL_A' and the bit line signal BL_B' may be limited within a specific range, and the amplifying-and-converting module 17 in the back end only performs differential amplifying operation on the bit line signal BL_A' and the bit line signal BL_B' which can prevent the backend amplifier from entering into the saturation status.

In addition, in FIG. 5, the subfigure 500 illustrates a diagram of the voltage $V_{DA}'$ (at the terminal $D_A'$) and the voltage $V_{DB}'$ (at the terminal $D_B'$) when the pixel circuit 40 perceives the ambient light only. The subfigure 502 illustrates a diagram of the voltage $V_{DA}'$ and the voltage $V_{DB}'$ when the pixel circuit 40 only perceives the reflected light from the light emitting module 11. As can be seen from the sub-figure 500, even the components of the pixel circuit 40 do not match up, under the condition of perceiving the ambient light continuously, the common mode voltage between the voltage $V_{DA}'$ and the voltage $V_{DB}'$ is limited with a specific range (without decreasing as time). Further, a differential mode voltage of the voltage $V_D A$ and the voltage $V_{DB}'$ is 0. As can be seen from the sub-figure 502, the common mode voltage between the voltage $V_{DA}'$ and the voltage $V_{DB}'$ is 0, and the differential mode voltage is related to the incident light of the light emitting module 11. In shout, by using the pixel circuit 40, the common mode voltage between the voltage $V_{DA}'$ and the voltage $V_{DB}'$ (or between the bit line signal BL_A' and the bit line signal BL_B') would be limited within the specific range, which can prevent the backend amplifier from entering into the saturation status.

In summary, the present application utilizes at least four shutter switches to charge the two capacitors in the pixel circuit alternatively. The signal components caused by manufacturing mismatch and clock signal mismatch are excluded. It prevents the common mode voltage from being too large and occupying too much dynamic range of the backend amplifier, i.e., prevents the backend amplifier from entering into the saturation status.

The foregoing is only embodiments of the present application, which is not intended to limit the present application. Any modification following the spirit and principle of the present application, equivalent substitutions, improvements should be included within the scope of the present application.

What is claimed is:

1. A pixel circuit, applied in an image sensing system, wherein the pixel circuit is coupled to a first collection node and a second collection node, characterized in that, the pixel circuit comprises:
   a first capacitor;
   a second capacitor;
   a first shutter switch, coupled between the first capacitor and the first collection node;
   a second shutter switch, coupled between the second capacitor and the second collection node;
   a third shutter switch, coupled between the second capacitor and the first collection node;
   a fourth shutter switch, coupled between the first capacitor and the second collection node; and
   a common mode reset module, coupled to the first capacitor and the second capacitor;
   wherein both of the first shutter switch and the third shutter switch are directly connected to the first collection node;
   wherein both of the second shutter switch and the fourth shutter switch are directly connected to the second collection node.

2. The pixel circuit as claim 1, characterized in that, within a first time, the first shutter switch and the second shutter switch are conducted, the third shutter switch and the fourth shutter switch are cutoff; and within a second time, the first shutter switch and the second shutter switch are cutoff, the third shutter switch and the fourth shutter switch are conducted.

3. The pixel circuit as claim 2, characterized in that, the first time and the second time have the same time length.

4. The pixel circuit as claim 1, characterized by, further comprising a first output module and a second output module, wherein the first output module comprises a first source follower transistor and a first read transistor, a gate of the first source follower transistor is coupled to the first capacitor, a source of the first source follower transistor is coupled to the first read transistor; the second output module comprises a second source follower transistor and a second read transistor, a gate of the second source follower transistor is coupled to the second capacitor, a source of the second source follower transistor is coupled to the second read transistor.

5. The pixel circuit as claim 1, characterized in that, the common mode reset module comprises:
   a first transistor, coupled to a first terminal of the first capacitor;

a second transistor, coupled to a first terminal of the second capacitor;
a first reset transistor, coupled between a second terminal of the first capacitor and the first terminal of the second capacitor; and
a second reset transistor, coupled between a second terminal of the second capacitor and the first terminal of the first capacitor.

6. The pixel circuit as claim 5, characterized in that, gates of the first transistor and the second transistor receive a common mode reset signal, and gates of the first reset transistor and the second reset transistor receive a pixel reset signal.

7. The pixel circuit as claim 5, characterized in that, when the first reset transistor and the second reset transistor are conducted, the first transistor and the second transistor are cutoff.

\* \* \* \* \*